Oct. 18, 1927.
E. H. VINCENT
1,646,074
STEERING WHEEL SWITCH
Filed Nov. 22, 1923
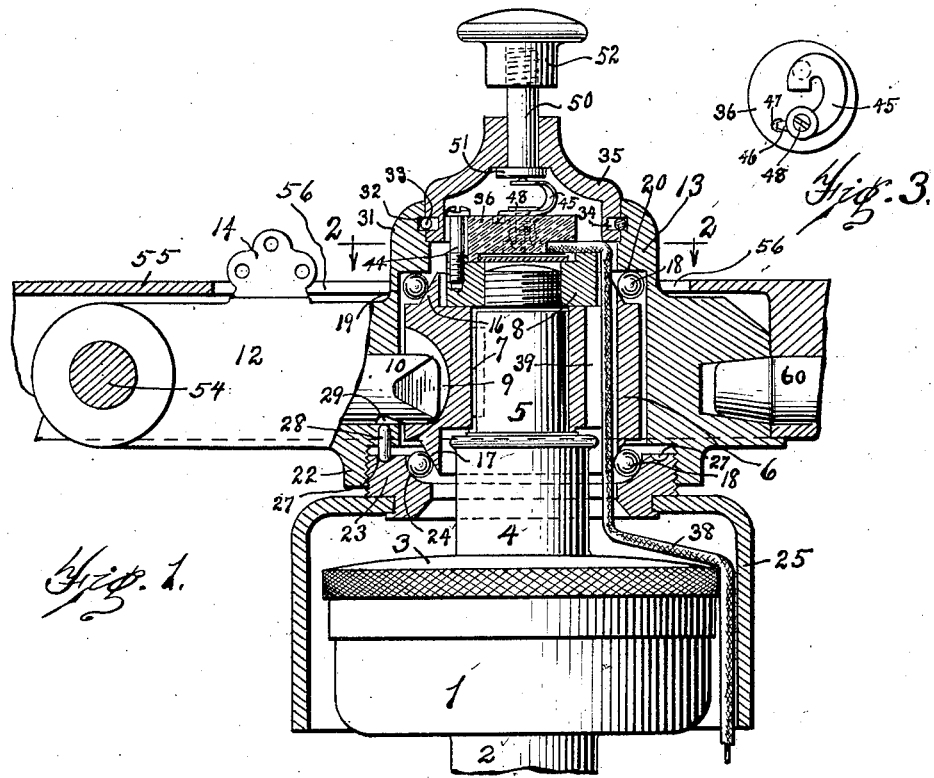
Fig. 1.
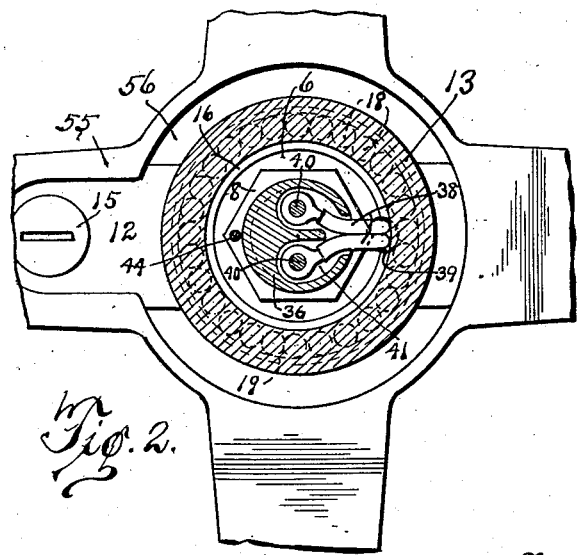
Fig. 2.
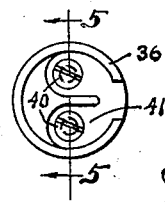
Fig. 3.
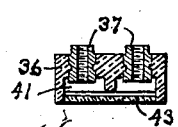
Fig. 4.
Fig. 5.
Inventor
Edward H. Vincent,
By Edward N. Pagelsen,
Attorney Patented Oct. 18, 1927.

1,646,074

UNITED STATES PATENT OFFICE.

EDWARD H. VINCENT, OF DETROIT, MICHIGAN.

STEERING-WHEEL SWITCH.

Application filed November 22, 1923. Serial No. 676,307.

This invention relates to the steering wheels of motor vehicles and particularly to means mounted thereon for closing an electric circuit to the horn or other signal, and its object is to provide a device of this character which can be readily installed, which will not get out of order, and which can be produced at comparatively low cost.

While this invention is shown embodied in a tilting-locking-steering wheel especially adapted for the Ford type of steering gear, it is not limited thereto but may be adapted to any desired type of tilting-steering wheel.

It consists of a steering shaft and a bushing secured thereto, this bushing being so apertured or formed with a passage that a conductor wire or several of them may extend longitudinally thereof, an insulating member at the upper end of the shaft and a pair of normally disengaged contacts mounted thereon, a steering head rotatably mounted on and enclosing the bushing, and a button carried by the head by means of which the contacts may be caused to engage.

It also consists in mounting this button in a cap which may be locked to the head when the remainder of the parts are in position.

It further consists in the details of construction illustrated in the accompanying drawing and particularly pointed out in the claims.

In the drawing, Fig. 1 is a central vertical section of a steering wheel embodying the present invention. Fig 2 is a section on the line 2—2 of Fig. 1. Fig. 3 is a top plan of the contact support and Fig. 4 is a bottom plan thereof. Fig. 5 is a section on the line 5—5 of Fig. 4.

Similar reference characters refer to like parts throughout the several views.

The drawing shows the well known Ford steering gear casing 1 at the upper end of the tube 2, a cap 3 for the casing having a tubular extension 4 and a stub shaft 5 on which a bushing 6 is secured in any desired manner, a key 7 and a nut 8 being shown. This bushing is shown formed with a notch 9 to receive the bolt 10 slidably mounted in the arm 12 extending from a substantially cylindrical steering-wheel-head 13. This bolt may be controlled in any desired manner, a key 14 and lock 15 being indicated.

The bushing is formed with conical ends 16 and 17 which receive the two sets of bearing balls 18. The wheel head 13 has the cylindrical bearing surface 19 and the radial surface 20 to engage the upper balls. This head is also formed with an internally threaded flange 22 to receive the nut 23 which has a curved bearing surface 24 for the lower set of bearing balls. This nut may be properly adjusted to place the correct pressure on the bearing balls. I have shown a cover 25 extending over or enclosing the cap 3 of the gear casing, which cover is attached to the nut 23 and is preferably of hardened metal so as to prevent access to this gear casing.

In order to lock the nut 23 in any desired position, I form its upper surface with a series of depressions or recesses 27 adapted to receive the pin 28 which is vertically slidable in the wheel head. The bolt 10 is provided with a notch 29 into which this pin may slide out of the recesses 27 when the nut is turned, but this can only occur when the key 14 has caused the bolt 10 to extend into the notch 9, which is when the wheel is operative. This adjustment of the bearings and the removal of the wheel head from the bushing can therefore only be made by a person having possession of the control key 14.

The upper end 31 of the wheel head is formed with a shallow groove 32 to partly receive a resilient locking ring 33 which also lies partly in a groove 34 in a cap 35 which extends down into this upper end. The spring ring may be contracted into the groove 34 in the cap so the cap may be slid into this upper end 31 of the wheel head, but the ring expands as shown and thereafter locks the cap in position.

The nut 8 is formed with a circular depression to receive a cylindrical body 36 of insulating material, or contact carrier, in which the threaded metal sleeves 37 are mounted. Wires 38 extend up within the cover 25 and through the hole 39 in the bushing and connect to these sleeves 37 by means of the screws 40. The body 36 is formed with a recess 41 to receive these screws and wires and a small disk 43 of insulation may be placed between these screws and the nut 8. A screw 44 may be employed to secure this insulating member in position. The wires 38 are preferably flexible and insulated.

Attached to one of these sleeves 37 by means of a screw 48 (Fig. 3) is a resilient curved contact 45 which has a curved finger 46 extending into a hole 47 in the contact carrier to hold the contact in position. A stem 50 is slidable in the cap 35 and has a plate 51 at its lower end adapted to press the free end of the contact 45 into engagement with the upper end of the other contact sleeve 37. A knob 52 may be screwed onto the outer end of this stem if desired.

If a single wire system is employed, no wire need connect to the anchoring sleeve 37 of the spring contact 45 as the entire steering mechanism including the stem 50 will then be grounded.

The arm 12 on the wheel-head is shown carrying a pin 54 on which the spider 55 of the steering wheel is mounted. This spider is formed with an opening 56 to give access to the key 14 and lock 15 and also to permit the wheel to be tilted without engaging the knob 52.

The spider and the rim (not shown) may therefore be swung up to give more clearance for the driver to leave his seat, the spider being secured in operative position by a slidable pin 60 in the usual manner.

It is not necessary to remove the wheel-head 13 from the bushing 6 before mounting the wheel on the shaft for the wheel-head 13, bushing 6, wires 38 and ring 23 may be positioned as a unit on the shaft 5 and secured in position by the nut 8. The contact carrier 36 may then be secured by the screw 44. The cap 35, stem 50, button 52 and the split ring 33 carried by the cap may then be united with the head 13 as before described. When in position, the ring 33 prevents the removal of the cap. It is necessary to remove the head 13 from the bushing before the wheel can be removed from the shaft, which may be done by unscrewing the locking ring 23 when the locking bolt 10 is in operative position. The plate 51 which is carried by the stem 50 may be of insulating material when a two-wire system is employed.

The details of construction and the proportions of the parts may all be changed by those skilled in the art without departing from the spirit of my invention as set forth in the following claims.

I claim:—

1. In combination, a rotatable steering shaft, an apertured bushing thereon, a nut to secure the bushing to the shaft, a removable wheel hub rotatably mounted on said bushing, an insulating member and a pair of normally disengaged electrical contacts carried by said nut within said wheel hub, manually operable means for causing the engagement of said contacts and electrical connecting wires extending through the aperture in the bushing and connected to said disengaged electrical contacts and removable therefrom after the wheel hub is removed from the bushing, and locking means to control removal of the wheel hub from the bushing.

2. In combination, a rotatable steering shaft, an apertured supporting member mounted thereon, a hollow wheel hub adapted to fit over and rotatably encompass said supporting member normally disengaged electrical contact means, mounted within said wheel hub, electrical connecting means extending into said wheel hub and through the aperture in said supporting member and attached to said electrical contact means, and means for causing the engagement of said contact means, removal of said electrical contact means and said electrical connecting means from said hub being prevented until the hub is removed from said supporting member and permitted after such removal.

3. In combination, a rotatable steering shaft, a supporting member having a longitudinal opening and mounted on said shaft, a removable hollow wheel hub adapted to fit over and encompass said supporting member, electrical contact means mounted within said wheel hub and normally out of engagement, flexible electrical connecting means adapted to enter said wheel hub and pass through said longitudinal opening in said supporting member and to be attached to said electrical contact means, means for causing the engagement of said contact means, said electrical contact means and said electrical connecting means being removable from said hub after said hub is removed from shaft, and means to positively lock the hub against removal.

4. In combination, a rotatable steering shaft, a longitudinally apertured supporting member mounted on said shaft and having its aperture offset from the axis of said shaft, a hollow wheel hub adapted to fit over and rotatably encompass said supporting member, electrical contact members mounted within said wheel hub and normally out of engagement, electrical connecting wires adapted to enter said wheel hub and pass through said apertured supporting member and to be attached to said electrical contact members, and means for causing the engagement of said electrical contact members.

5. In combination, a rotatable steering shaft, a cylindrical supporting member mounted on said shaft and having a longitudinal hole offset from the axis of said shaft, a hollow wheel hub adapted to fit over and rotatably encompass said supporting member, a pair of normally disengaged electrical contacts mounted within said hub and adjacent the upper end of said shaft and insulated therefrom, insulated electrical connecting wires extending into the lower portion of said wheel hub and passing up through the longitudinal hole in said supporting member and attached to said electrical contacts, and means for causing the engagement of said electrical contacts.

6. In combination, a rotatable steering shaft, a hollow removable wheel hub mounted thereon, normally disengaged electrical contacts mounted within said hub and adjacent the upper end of said shaft and insulated therefrom, electrical wires adapted to enter said hub and to be attached to said electrical contacts, said electrical contacts and wires being removable from said hub after it is removed from the shaft, means to control the removal of the hub from said shaft, and means for causing the engagement of said electrical contacts.

7. In combination, a rotatable steering shaft, a hollow removable wheel hub mounted thereon, normally disengaged insulated electrical contacts mounted within said hub and adjacent the upper end of said shaft, electrical wires adapted to enter said hub and to be attached to said electrical contacts, removal of said electrical contacts and wires being prevented until said hub is removed from the shaft, means carried by the hub for causing the engagement of said electrical contacts and removable from the hub after said hub is removed from said shaft, and locking means to control removal of said hub.

8. In combination, a rotatable steering shaft, a hollow removable wheel hub mounted thereon, a cap comprising the upper end of said hub, means to lock said cap to said hub to prevent the removal thereof, normally disengaged electrical contacts mounted within said hub and adjacent the upper end of said shaft, means mounted in said cap for causing electrical engagement between said contacts, removal of said contacts being prevented until said hub is removed from the shaft, and means to control the removal of the hub from said shaft.

EDWARD H. VINCENT.